(12) United States Patent
Ghosh et al.

(10) Patent No.: US 12,547,904 B2
(45) Date of Patent: Feb. 10, 2026

(54) ENSURING DATA COMPLETENESS USING CONTEXT AWARE MACHINE LEARNING MODELS

(71) Applicant: International Business Machines Corporation, Armonk, NY (US)

(72) Inventors: Partho Ghosh, Kolkata (IN); Sarbajit K. Rakshit, Kolkata (IN); Hari Krishna Prasad Bheemavarapu, Visakhapatnam (IN); Saraswathi Sailaja Perumalla, Visakhapatnam (IN)

(73) Assignee: International Business Machines Corporation, Armonk, NY (US)

( * ) Notice: Subject to any disclaimer, the term of this patent is extended or adjusted under 35 U.S.C. 154(b) by 1134 days.

(21) Appl. No.: 17/449,064

(22) Filed: Sep. 27, 2021

(65) Prior Publication Data
US 2023/0098555 A1    Mar. 30, 2023

(51) Int. Cl.
*G06N 5/022* (2023.01)
*G06F 16/2455* (2019.01)

(52) U.S. Cl.
CPC ....... *G06N 5/022* (2013.01); *G06F 16/24568* (2019.01)

(58) Field of Classification Search
CPC .................. G06N 5/022; G06F 16/24568
See application file for complete search history.

(56) References Cited

U.S. PATENT DOCUMENTS

| | | |
|---|---|---|
| 8,959,007 B2 | 2/2015 | Khella |
| 10,217,068 B1 * | 2/2019 | Davis .............. G07F 9/026 |
| 10,229,394 B1 * | 3/2019 | Davis .............. H04L 41/5074 |
| 10,565,566 B1 * | 2/2020 | Davis .............. G06Q 10/20 |
| 10,924,347 B1 * | 2/2021 | Narsian .......... H04L 41/0816 |
| 11,544,136 B1 * | 1/2023 | Pekel .............. G06N 20/00 |
| 2017/0359735 A1 * | 12/2017 | Jain .............. H04W 24/02 |
| 2018/0060153 A1 * | 3/2018 | Innes .............. H04L 41/06 |
| 2018/0288159 A1 | 10/2018 | Moustafa |

(Continued)

OTHER PUBLICATIONS

Borges et al., "Survey of Context Information Fusion for Sensor Networks based Ubiquitous Systems," Journal of Sensor and Actuator Networks, 2013, 27 pgs. (Year: 2013).*

(Continued)

*Primary Examiner* — Eric J. Bycer
(74) *Attorney, Agent, or Firm* — Michael A. Petrocelli

(57) ABSTRACT

A computer collects data relevant to a primary activity occurring in a data gathering zone. The computer receives from an Activity Indication Source (AIS), an indication of a primary activity associated with a Data Gathering Zone (DGZ). The computer determines, uses a first Machine Learning (ML) model to identify data streams relevant for data gathering activities, a Target Set of Data Streams (TSDS) associated with the primary activity. The computer identifies within a set of sensors having a monitoring arrangement with the DGZ, a set of preferred sensors to provide the TSDS. The computer determines using a second Machine Learning (ML) model trained to identify Preferred Data Stream Attributes (PDSAs) for data gathering activities, a target set of PDSAs. The computer retrieves, a data stream relevant to the TSDS. The computer compares attributes of the data stream to the PDSAs and initiates corrective action as necessary.

17 Claims, 8 Drawing Sheets

(56) References Cited

U.S. PATENT DOCUMENTS

| | | | |
|---|---|---|---|
| 2018/0309856 A1* | 10/2018 | Tashiro | H04L 41/022 |
| 2018/0356800 A1* | 12/2018 | Chao | G06F 16/10 |
| 2019/0138932 A1* | 5/2019 | Akella | G06Q 10/06 |
| 2019/0158363 A1* | 5/2019 | Zhu | H04L 41/142 |
| 2019/0339688 A1 | 11/2019 | Cella | |
| 2020/0252122 A1 | 8/2020 | Tofighbakhsh | |
| 2021/0105443 A1 | 4/2021 | Fridental | |
| 2022/0005559 A1* | 1/2022 | Burton | G16H 10/60 |
| 2022/0201099 A1* | 6/2022 | Gerver | G06F 11/302 |
| 2022/0377000 A1* | 11/2022 | Musa | H04L 43/045 |

OTHER PUBLICATIONS

De Paolis et al., "Sensor data collection and analytics with ThingsBoard and Spark Streaming," 2018 IEEE Workshop on Environmental, Energy, and Structural Monitoring Systems (EESMS), 6 pgs. (Year: 2018).*

Bezzerra et al., "Extracting Value from Industrial Alarms and Events: A Data-Driven Approach Based on Exploratory Data Analysis," Sensors, 2019, 21 pgs. (Year: 2019).*

Shi et al., "A Survey of Data Semantization in Internet of Things," 2018 IEEE Workshop in Environment, Energy, and Structural Monitoring Systems, 2018, 20 pgs. (Year: 2018).*

Mell, et al., "The NIST Definition of Cloud Computing", National Institute of Standards and Technology, Special Publication 800-145, Sep. 2011, 7 pages.

* cited by examiner

ENSURING DATA COMPLETENESS USING CONTEXT AWARE MACHINE LEARNING MODELS

BACKGROUND

The present invention relates generally to the field of sensor-based data gathering and, and more specifically, to ensuring data completeness for an identified data gathering context.

Sensors and other devices that consume low amounts of power and provide near-constant sources of environmental and other data are often referred to as Internet of Things "IoT" devices. These devices, as well as more conventional sensors, may be used in groups to provide information about activities occurring in a Data Gathering Zone "DGZ" (e.g., a shop floor, home environment, farming or agricultural setting, etc.). The combination of an activity occurring at a particular time in a particular DGZ may be sometimes be referred to as a data gathering context (e.g., manufacturing or other monitored activity occurring on a shop floor occurring during business hours, cooking or other monitored activity occurring in a home at a predetermined time established for meals or relaxing, harvesting or other monitored activity in an agricultural setting during a planting or harvesting season, and so forth) about which certain information might be useful for a variety of purposes, including adherence to safety or other governance, providing guidance for undertaking the activity, keeping records to track performance, and so forth.

In some cases, a variety of events may occur within a DGZ (e.g., simultaneously and at different times), and some sensors associated with providing information about the zone may be more suited to provide information about some activities than others. For example, in an agriculture-based monitoring zone, both planting and harvesting activities may occur at different times, and information from certain sensors may be especially useful to monitor planting activities (e.g., sensors that count deposited seeds and provide associated data streams might be particularly relevant for a planting context), while other sensors might be especially useful to describe harvesting activities (that locate mature plants and provide associated data streams might be particularly relevant for a harvesting context).

When suitable data streams (e.g., streams meeting established criteria) are gathered from an appropriate set of sensors associated with a given activity, the data collected may be described as complete (e.g., the data provides a desired amount, quality, and type of information about the monitored activity). Unfortunately, determining which sensors and data stream attributes are most relevant to data completeness for a given activity can be troublesome, as standards for data completeness vary widely among data gathering contexts, sometimes even within a given DGZ.

SUMMARY

According to one embodiment, a computer-implemented method for collecting data relevant to a primary activity occurring in a data gathering zone, including receiving, by a computer from an Activity Indication Source (AIS) in communication with the computer, an indication of a primary activity associated with a Data Gathering Zone (DGZ). The computer determines, using a first Machine Learning (ML) model trained to identify data streams relevant for data gathering activities from a corpus of Data Gathering Activity Metadata (DGAM) available to the computer, a Target Set of Data Streams (TSDS) associated with the primary activity. The computer, responsive to determining the TSDS, identifies by the computer, within a set of sensors having a monitoring arrangement with the DGZ, a set of preferred sensors adapted and arranged to provide the TSDS. The computer determines, using a second Machine Learning (ML) model trained to identify Preferred Data Stream Attributes (PDSAs) for data gathering activities from the DGAM, a target set of PDSAs associated with the primary activity. The computer, responsive to determining the target set of PDSAs, retrieves from the set of preferred sensors, at least one data stream relevant to the TSDS. The computer compares attributes of the at least one data stream to the target set of PDSAs and initiating a corrective action when a predetermined trigger condition is identified. According to aspects of the invention, the predetermined trigger condition is an attribute of the at least one data stream indicating that one of the preferred set of sensors is located outside of a preferred position; and the corrective action is selected from a group consisting of directing the one of the preferred sensors into the preferred position and sending an alert to a user interface operatively connected to the server computer. According to aspects of the invention, the predetermined trigger condition is an attribute of the at least one data stream indicating that data stream content is outside of a predetermined acceptable data content range, and the corrective action is selected from a group consisting of replacing received data stream content with substitute data content from a replacement sensor having a monitoring arrangement with the DGZ, replacing received data stream content with nominal data from a database available to the server computer, and sending an alert to a user interface operatively connected to the server computer. According to aspects of the invention, the predetermined trigger condition is an attribute of the at least one data stream indicating that data stream quality is beyond an acceptable fidelity threshold, and corrective action is selected from a group consisting of replacing received data stream content with substitute data content from a replacement sensor having a monitoring arrangement with the DGZ, replacing received data stream content with nominal data from a database available to the server computer, and sending an alert to a user interface operatively connected to the server computer. According to aspects of the invention, the predetermined trigger condition is an attribute of the at least one data stream indicating that an out-of-format preferred sensor is streaming data in a non-preferred format (e.g., an out of data protocol, etc.), and the corrective action is selected from a group consisting of updating the out-of-format sensor to stream data in a preferred format, replacing the out-of-format sensor, and sending an alert to a user interface operatively connected to the server computer. According to aspects of the invention, the predetermined trigger condition is an attribute of the at least one data stream indicating that a sensor has reached a maintenance interval milestone, and the corrective action is selected from a group consisting of conducting a predetermined maintenance activity associated with the milestone and sending an alert to a user interface operatively connected to the server computer. According to aspects of the invention, the computer identifies within the at least one data stream, an attribute indicating a predefined replacement condition is met; and in response to identifying the replacement condition being met, initiating by the computer, a responsive action selected from replacing a sensor associated with the replacement condition, and sending an alert to a user interface operatively connected to the server computer.

According to another embodiment a system of collecting data relevant to a primary activity occurring in a data gathering zone, including a computer system comprising a computer readable storage medium having program instructions embodied therewith, the program instructions executable by a computer to cause the computer to: receive from an Activity Indication Source (AIS) in communication with the computer, an indication of a primary activity associated with a Data Gathering Zone (DGZ); determine using a first Machine Learning (ML) model trained to identify data streams relevant for data gathering activities from a corpus of Data Gathering Activity Metadata (DGAM) available to the computer, a Target Set of Data Streams (TSDS) associated with the primary activity; responsive to determining the TSDS, identifying by the computer, within a set of sensors having a monitoring arrangement with the DGZ, a set of preferred sensors adapted and arranged to provide the TSDS; determine using a second Machine Learning (ML) model trained to identify Preferred Data Stream Attributes (PDSAs) for data gathering activities from the DGAM, a target set of PDSAs associated with the primary activity; responsive to determining the target set of PDSAs, retrieve from the set of preferred sensors, at least one data stream relevant to the TSDS; and compare attributes of the at least one data stream to the target set of PDSAs and initiate a corrective action when a predetermined trigger condition is identified.

According to another embodiment a computer program product to collect data relevant to a primary activity occurring in a data gathering zone, the computer program product comprising a computer readable storage medium having program instructions embodied therewith, the program instructions executable by a computer to cause the computer to: receive, using the computer, from an Activity Indication Source (AIS) in communication with the computer, an indication of a primary activity associated with a Data Gathering Zone (DGZ); determine using a first Machine Learning (ML) model trained to identify data streams relevant for data gathering activities from a corpus of Data Gathering Activity Metadata (DGAM) available to the computer, a Target Set of Data Streams (TSDS) associated with the primary activity; responsive to determining the TSDS, identify within a set of sensors having a monitoring arrangement with the DGZ, a set of preferred sensors adapted and arranged to provide the TSDS; determine using a second Machine Learning (ML) model trained to identify Preferred Data Stream Attributes (PDSAs) for data gathering activities from the DGAM, a target set of PDSAs associated with the primary activity; responsive to determining the target set of PDSAs, retrieve from the set of preferred sensors, at least one data stream relevant to the TSDS; and compare attributes of the at least one data stream to the target set of PDSAs and initiating a corrective action when a predetermined trigger condition is identified.

The present disclosure recognizes and addresses the shortcomings and problems associated with ensuring data completeness across multiple data gathering contexts, as the nature of preferred sensors and data stream attributes varies among contexts. As used herein, the term "data completeness" includes data having preferred, context-relevant attributes (e.g., falling within predetermined values ranges, having preferred format, provides expected qualitative and quantitative information about a monitored data gathering zone, etc.), which is collected from data streams having preferred, context-relevant attributes (e.g., provided with quality exceeding a fidelity threshold, transmitted in an expected protocol or format, provided in accordance with expected governance or security expectations, etc.), so that desired data-based actions may be undertaken with an expected degree of confidence. Although 100% data completeness (e.g., a unitless value that provides, for example, an indication of whether all relevant preference factors are being met for a given data set) is desired, a data set with a completeness degree exceeding 80% may be acceptable in some contexts. It is noted that the acceptability threshold for data completeness may vary according to context; higher (or lower) degrees of completeness may be selected by one of skill in this field.

Aspects of the invention identify preferred sensor feeds, along with associated formats, protocols, etc., to be captured for completeness of captured data within a given data gathering context.

Aspects of the invention enable collecting data from a set of preferred sensors within a group of sensors associated with a data gathering zone to ensure data completeness.

Aspects of the invention reposition preferred sensors, as needed, to ensure data completeness (e.g., to compensate for a moving context, to correct the location or orientation of a poorly positioned sensor, to pro-actively position a mobile sensor, etc.).

Aspects of the invention gather signals from one or more sensors in a network of sensors associated with a data gathering zone, capturing data and sending the captured data to a remote data processing system.

Aspects of the invention identifies preferred sensors types (e.g., speed sensors, temperature sensors, pressure sensors, smell or particulate sensors, etc.) from which to gather, in an associated data zone, data types determined by the system as relevant for data completeness in an identified data gathering context.

Aspects of the invention use Machine Learning (ML) models to identify and collect data from preferred sensors associated with an identified data gathering context.

Aspects of the invention use Machine Learning (ML) models to identify and assess the presence of preferred data stream attributes associated with an identified data gathering context.

Aspects of the invention use Machine Learning (ML) models to identify and assess the presence of trigger conditions within collected data and within data stream attributes and initiate associated corrective action.

Aspects of the invention use Machine Learning (ML) models to identify and assess the presence of replacement conditions within collected data and within data stream attributes and initiate associated remedial action.

Aspects of the invention apply ML models to historic sensor positioning data to identify and direct preferred sensor placement (both absolute and relative to other sensors and selected elements in a relevant DGZ), promoting data completeness for an identified context.

Aspects of the invention apply ML models to historic sensor positioning data to identify and direct preferred sensor movement, promoting data completeness for contexts having a dynamic DGZ.

Aspects of the invention apply ML models to historic security context data to identify (and assess the adherence to) data stream fidelity thresholds and formats, minimizing data loss and signal degradation by dynamic policy selection, assurance of policy and firewall update application, etc., to promote data completeness for an identified context.

Aspects of the invention apply ML models to historic contextual governance policy data and installed sensors to identify and apply context-relevant error mitigation routines (e.g., data stream aggregation, duplicate data capturing, verification of replica data, etc.), to promote data completeness for an identified context.

Aspects of the invention apply ML models to historic sensor feed anomaly data to determine (and assess performance regarding) a preferred data anomaly (e.g., out of range data) threshold, to promote data completeness for an identified context.

Aspects of the invention apply ML models to historic storage compliance rule data to determine (and assess performance regarding) relevant storage procedures, archival packages, replication monitoring, to promote data completeness for an identified context.

Aspects of the invention apply ML models to historic maintenance data to identify (and determine the presence of) maintenance triggers, directing cleaning or other associated maintenance routines, to promote data completeness for an identified context.

Aspects of the invention identify types of data to be captured for an identified activity (from a corpus of data and metadata historically relevant for the activity) to generate a data completeness rule.

Aspects of the invention identify signal strength and relative position of sensors to be used for an identified activity from a corpus of data and metadata historically relevant for the activity.

Aspects of the invention identify a boundary (e.g., a geographical spread) of a monitoring context and how the sensors are to be placed within an associated data gathering zone from a corpus of data and metadata historically relevant for the activity.

Aspects of the invention determine what types of data are to be captured based on an identified context boundary and an associated generated data completeness rule.

Aspects of the invention determine the preferred physical location of the existing sensors in an associated data gathering zone.

Aspects of the invention determine whether an existing set of sensors can ensure data completeness and deploying additional (or replacement) sensors when needed.

Aspects of the invention interface with one or more mobile sensors and will position the sensors as needed to promote data completeness.

Aspects of the invention identify if a monitored context is mobile and will coordinate relevant sensor location or motion accordingly to promote data completeness.

Aspects of the invention assess relevant sensor feed quality and will coordinate sensor changes as needed.

Aspects of the invention identify sensor feed anomalies apply relevant fault tolerances to replace sensors or identify alternative sensor data to promote data completeness.

Aspects of the invention perform required sensor maintenance.

Aspects of the invention perform sensors replacement and cleaning as needed, to promote data completeness.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. The drawings are set forth as below as.

DETAILED DESCRIPTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a participant" includes reference to one or more of such participants unless the context clearly dictates otherwise.

Figure 1:
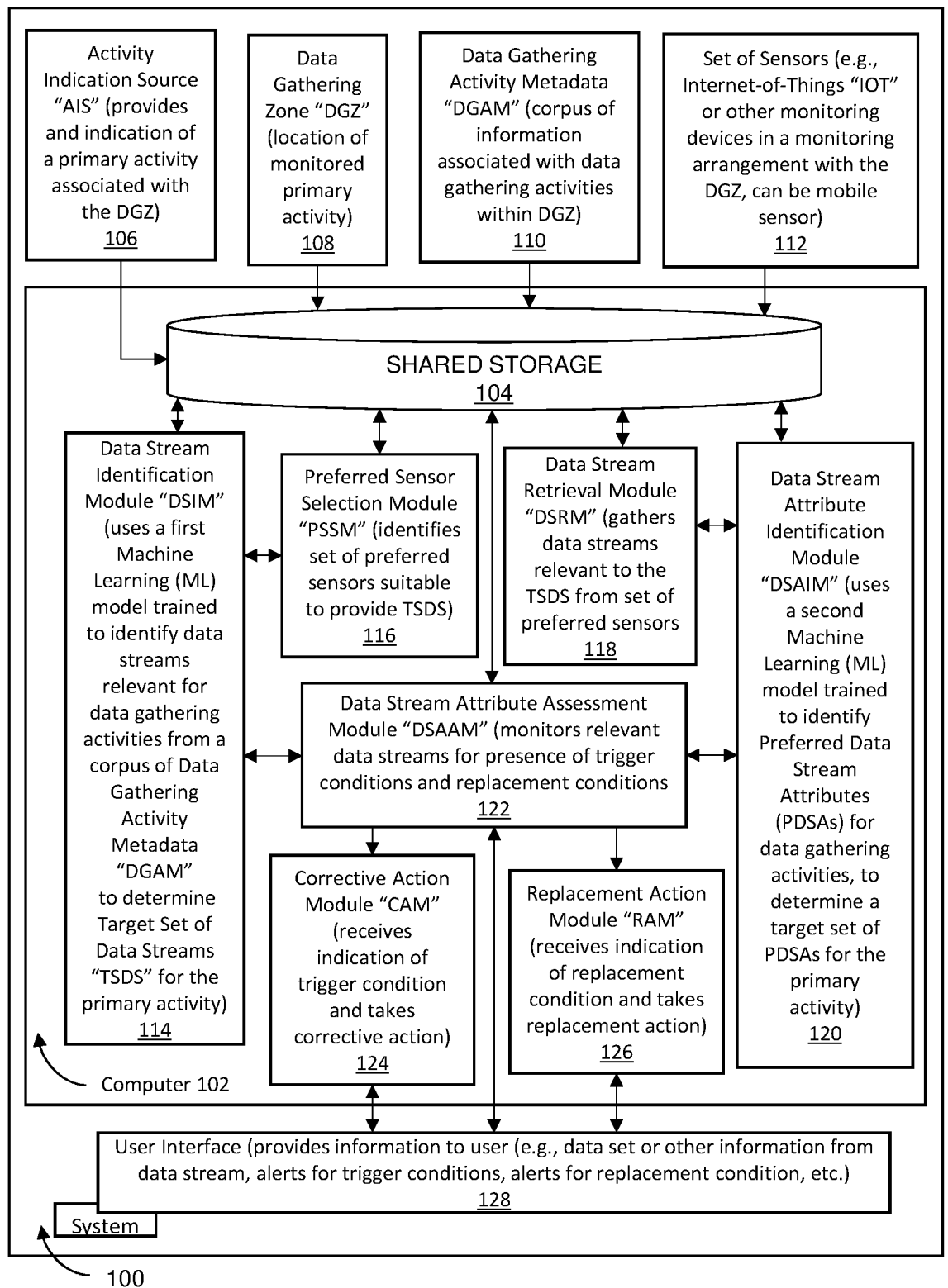
FIG. 1 is a schematic block diagram illustrating an overview of a system for computer-implemented system that uses Machine Learning (ML) models to automatically establish and apply data stream attribute standards to ensure data completeness in identified data gathering contexts according to embodiments of the present invention.
Figure 2:
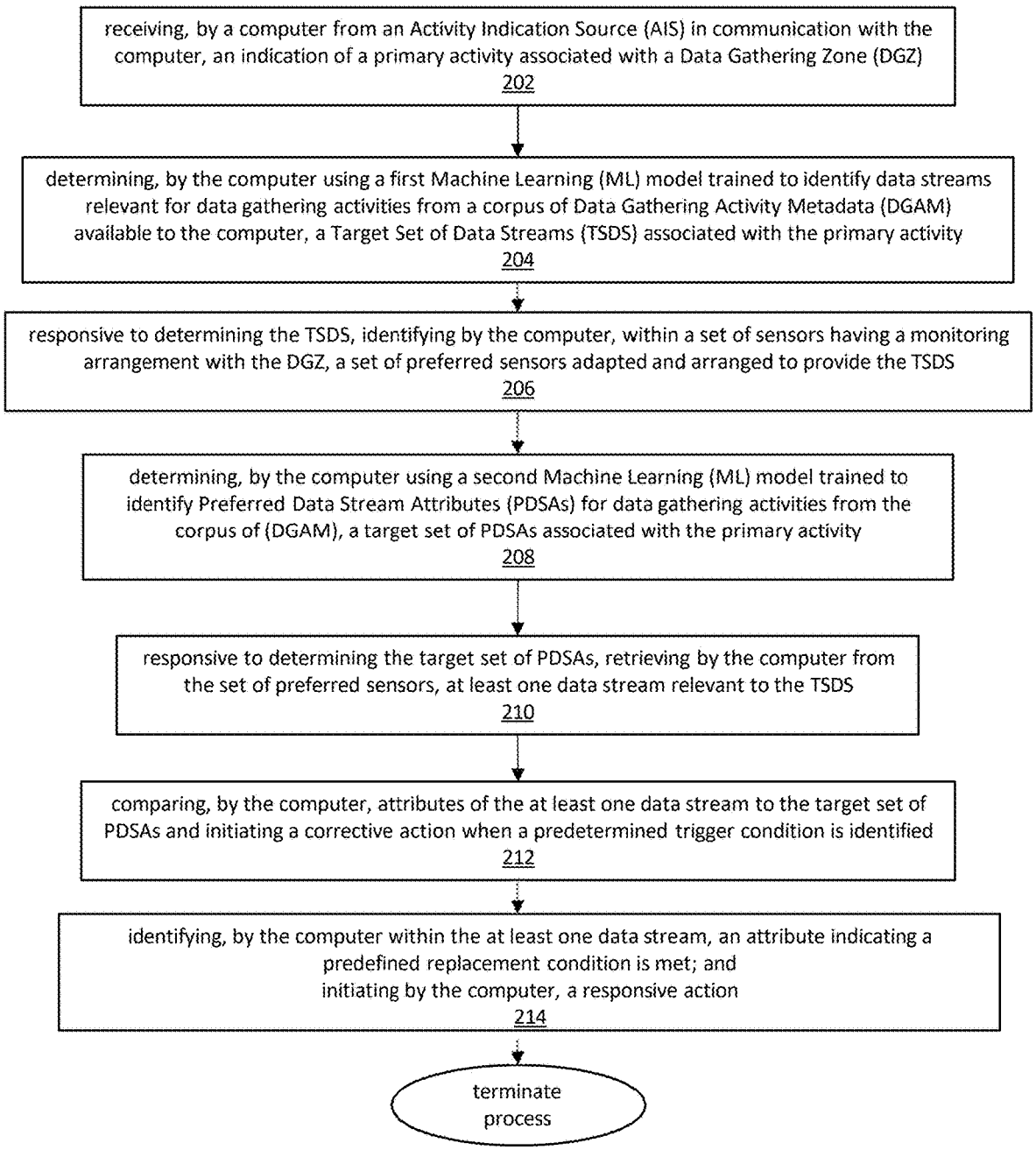
FIG. 2 is a flowchart illustrating a method, implemented using the system shown in FIG. 1, to automatically establish and apply data stream attribute standards to ensure data completeness in identified data gathering contexts according to embodiments of the present invention.

Now with combined reference to the Figures generally and with particular reference to FIG. 1 and FIG. 2, an overview of a method for using Machine Learning (ML) models to automatically establish and apply data stream attribute standards to ensure data completeness in identified data gathering contexts within a system 100 as carried out by a server computer 102 having optionally shared storage 104.

The server computer 102 is in operative communication with Activity Indication Source "AIS" 106 that provides an indication of a primary activity associated with an associated Data Gathering Zone "DGZ" 108. The DGZ is a location in which a monitored primary activity (e.g., an activity for about which a complete data is desired).

The server computer 102 receives a set of Data Gathering Activity Metadata "DGAM" 110. According to aspects of the invention, the DGAM 110 is corpus of historic information associated with various data gathering activities within DGZ 108.

Figure 5A:
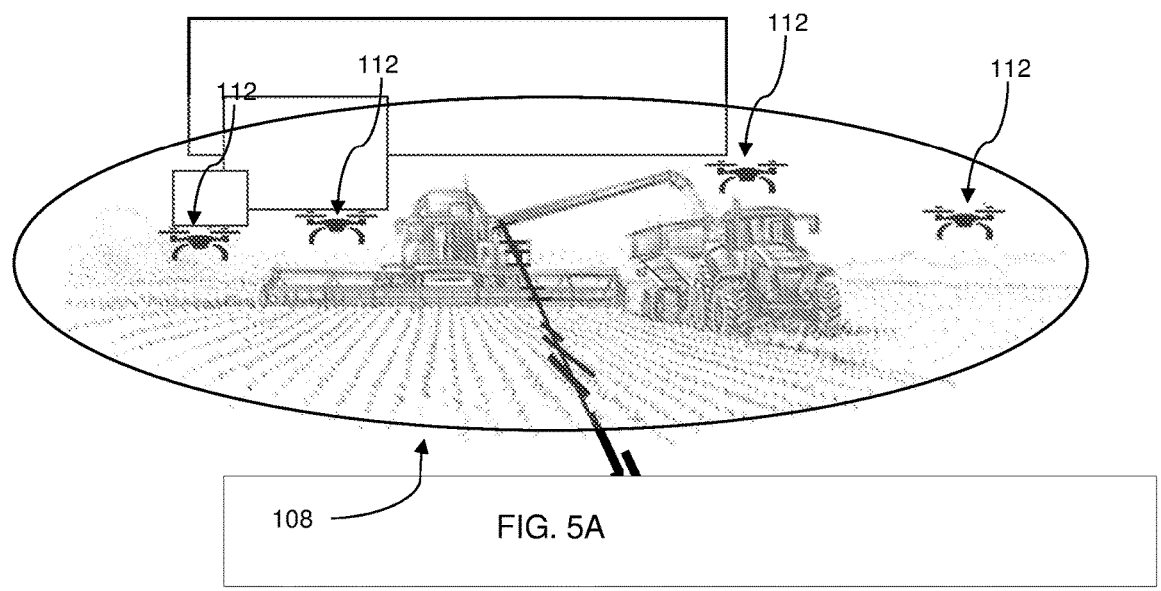
FIG. 5A is a schematic representation of aspects of the system shown in FIG. 1 being used in a data gathering zone, according to aspects of the invention.

The server computer 102 is in communicative connection with a set of sensors 112 (e.g., Internet-of-Things "IOT" or other monitoring devices in a monitoring arrangement with the DGZ 180). According to aspects of the invention, the sensors 112 (e.g., as shown schematically in FIG. 5A) can be mobile or fixed. It is noted that fixed sensors are best suited for certain primary activities, while mobile sensors are suited for others. According to aspects of the invention, some of the sensors 112 in a monitoring arrangement with a given DGZ 108 may be more relevant to some activities that occur in the DGZ than to others, and aspects of the invention identify (as described more fully below) which sensors are most relevant for identified contexts.

The server computer 102 includes Data Stream Identification Module "DSIM" 114, which identifies sets of data streams relevant for data gathering activities. According to aspects of the invention DSM 114 uses a Machine Learning (ML) model trained to identify data streams relevant for data gathering activities from the DGAM 110 corpus content. According to aspects of the invention, the DSM 114 uses content from of the DGAM 110 to determine a Target Set of Data Streams "TSDS" associated with the primary activity. According to aspects of the invention, a TSDS associated with a given context is expected to promote data completeness for the associated context.

Figure 5B:
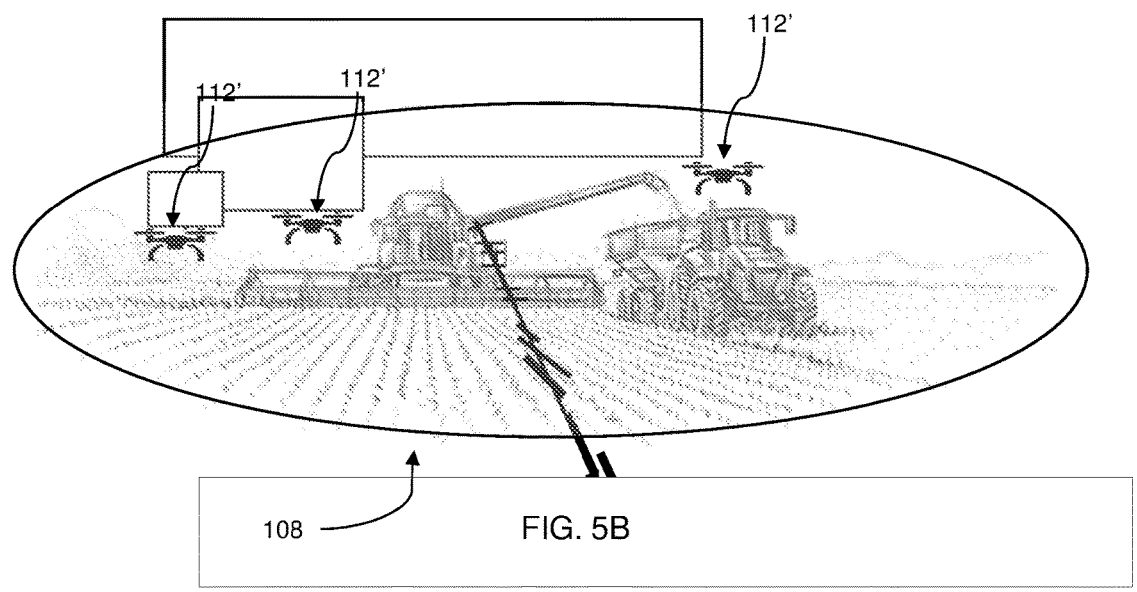
FIG. 5B is a schematic representation of aspects of the system shown in FIG. 1 being used in a data gathering zone, according to aspects of the invention.

The sever computer 102 includes Preferred Sensor Selection Module "PSSM" 116 that identifies sets of preferred sensors 112' (e.g., as shown schematically in FIG. 5B) suitable to provide the TSDS for a given context. Since, as noted elsewhere, a given DGZ 110 may have many associated sensors, each of which may only be relevant for a subset of activities occurring in the zone, the PSSM 116 strategically identifies sensors most likely to provide data completeness for an identified context.

The sever computer 102 includes Data Stream Retrieval Module "DSRM" 118 that gathers data streams relevant to the TSDS from set of preferred sensors. According to aspects of the invention, the DSRM 118 coordinates communication with the set of preferred sensors and ensures that, for a given context, the server computer 102 receives data streams sufficient to provide data completeness. According to aspects of the invention, the DSRM 118 also ensures, for sensors capable of delivering several kinds of data streams, the server computer 102 receives the preferred data streams (e.g., the associated TSDS) for a relevant context).

The server Data Stream Attribute Identification Module "DSAIM" 120 that to determine a target set of PDSAs for the primary activity. According to aspects of the invention, the DSAIM 120 uses a Machine Learning (ML) model trained to identify Preferred Data Stream Attributes (PD-SAs) associated with data completeness for various data gathering activities. According to aspects of the invention, the server computer 102 will use the DSAIM 120 model characteristics identified by the DSAIM when evaluating data stream and data stream content for data completeness.

The server computer 102 includes Data Stream Attribute Assessment Module "DSAAM" 122 that monitors relevant data streams for presence of trigger conditions and replacement conditions. According to aspects of the invention, the server computer 102 receives data streams from the set of preferred sensors 112', uses the DSAAM 122 to determine when additional action is appropriate, and then takes action accordingly.

The server computer 102 includes Corrective Action Module "CAM" 124 that identifies the presence of trigger conditions within attributes of received data streams (and associated data content) and initiates corrective action to address the condition.

The server computer 102 includes Replacement Action Module "RAM" 126 that identifies the presence of replacement conditions within attributes of received data streams (and associated data content) and initiates replacement action to address the condition.

The server computer 102 communication with user interface 128 to provide information (e.g., a data sets having preferred attributes or other information from received and curated data streams, alerts for trigger conditions, alerts for replacement condition, etc.) to an interested user, or to a preferred storage system for archiving or for another use selected by one of skill in this field.

Now with reference specifically to FIG. 2, and to other figures generally, a method of automatically establishing and applying data stream attribute standards to ensure data completeness in identified data gathering contexts, according to aspects of the invention, will be described. The server computer 102 at block 202 receives from the Activity Indication Source (AIS) 106, an indication of a primary activity associated with a Data Gathering Zone (DGZ) 108. A representative example of an DGZ 108 is shown schematically in FIG. 5A and FIG. 5B, where the primary activity of harvesting activity is represented in an agricultural setting.

It is noted that although the server computer 102 may, as described above, receive an indication of a primary activity to monitor from the AIS 106, the server computer may also determine a primary activity directly. In an embodiment, the server computer 102 has access to an optional Machine Learning (ML) model that is trained to recognize primary activities by considering available activity metadata, and the server computer uses the optional model to recognize a relevant primary activity by analyzing information contained in the provided DGAM 110.

It is noted that different types of data are associated with providing a complete assessment of different kinds of monitored activities. For example, data streams indicating element position and speed are relevant to activities that are evaluated in terms of monitored velocity, temperature-indicting data streams are relevant to activities that are sensitive to heat and cold, and myriad other data types are relevant for other monitored activities.

It is noted that if a relevant sensor feed (e.g., a signal containing relevant data) is not adequately captured, computations or other analysis relying on the data can be inaccurate, due to a lack data completeness, and aspects of the present invention identify which data streams are relevant for a complete set of data associated with an identified activity. In particular, the server computer 102 determines, via DSIM 114 at block 204, a Target Set of Data Streams (TSDS) associated with the identified primary activity. According to aspects of the invention, the server computer 120 applies, to the corpus of Data Gathering Activity Metadata (DGAM) 110, a first Machine Learning (ML) model that is trained to identify data streams associated with data completeness for various data gathering activities. In an embodiment, the DSIM 114 analyzes the DGAM 110 to identify a preferred set of data streams (e.g., the TSDS) for the identified primary activity identified.

It is noted that not all sensors 112 arranged to monitor a given Data Gathering Zone 108 are relevant for all data streams. Accordingly, aspects of the present invention determine which sensors 112 will provide the data streams identified as relevant (e.g., the TSDS) for data completeness of the identified activity. In particular, the server computer 120 identifies within the group of sensors 112 available to monitor the DGZ 108, via Preferred Sensor Selection Module "PSSM" 116 at block 206, a set of preferred sensors 112' (e.g., as shown schematically in FIG. 5B) adapted (e.g., temperature sensors to provide temperature-based data streams, etc.) and arranged (e.g., positioned and oriented to gather information about temperature sensitive elements within the DGZ) to provide the Target Set of Data Streams (TSDS) associated with the identified primary activity. In an embodiment, the set of preferred sensors 112' includes, at least in part, the sensors having output characteristics that match the TSDS for the identified activity.

It is noted that, in addition to certain kinds of data (e.g., types of information provided by data feed signals from specialized sensor types) being relevant to certain activities, certain data stream characteristics are, similarly, preferred for certain activities. For example, thresholds of quality (e.g., preferred data stream signal fidelity minimums, etc.), desired stream format (e.g., protocols for security, industry-mandated governance requirements, etc.), sensor location (e.g., position within a relevant DGZ 108 or with respect to other sensors, etc.), expected data content ranges (e.g., nominal data values that, when exceeded, indicate a damaged or malfunctioning sensor, etc.), indications of operation or maintenance milestones (e.g., remaining percentage of expected sensor life, battery consumption trends, etc.). The sets of relevant attributes can vary widely among activities, and aspects of the present invention identify a target set of Preferred Data Stream Attributes (PDSAs) associated with the identified primary activity. In particular, the server computer 102 determines the PDSAs at block 208, via the Data Stream Attribute Identification Module "DSAIM" 120. In an embodiment, the DSAIM 120 includes a second ML model that is trained to identify patterns of monitored conditions typically included in complete data sets for activities about which data has been previously collected. In an embodiment, the server computer 120 applies the second ML model to the DGAM 110 and determines a set of PDSAs for the identified activity. It is noted that the second ML model may employ algorithms generated during supervised training (e.g., using sets of labelled training data for known activities), as well as unsupervised learning to group data stream attributes into clusters of generally-applicable, complete-data-indicating attributes, with the selection of training applied being based on the judgment of one skilled in this field. In some contexts, unsupervised learning models may use transfer learning methodologies selected to allow prediction of preferred attributes for a wide range of activities.

The server computer 102 receives relevant data streams at block 210. In an embodiment, the server computer 102, in response to determining the target set of PDSAs, coordinates reception, from the set of preferred sensors 112', of at least one data stream relevant to the TSDS.

The server computer 102 compares, at block 212, attributes of the received data streams to the target set of PDSAs and initiates a corrective action when a predetermined trigger condition is identified. In particular, as shown with additional reference to FIG. 3 (in which details of the cooperation 300 between Data Stream Attribute Assessment Module "DSAAM" 122 and Corrective Action Module "CAM" 124 occurring in block 212 are shown schematically), the server computer 102 monitors relevant data streams for the presence of trigger conditions (via Data Stream Attribute Assessment Module "DSAAM" 122). According to aspects of the invention, indications of identified trigger conditions are sent to Corrective Action Module "CAM" 124 for remedial action. According to aspects of the invention, and discussed more fully below, trigger conditions include receiving data stream content that indicates a Preferred Data Stream Attribute "PDSA" threshold has been exceeded.

It is noted that PDSAs may vary in importance based on the domain of a given activity. Aspects of the present invention can receive information about relative attribute weight (e.g., via input from user interface 128, from a domain-indexed lookup table, etc.), and the DSAAM 122 will consider provided relevant attribute weight information when assessing data completeness. It is also noted that some PDSAs may be satisfied to lesser or greater degree while still providing acceptable levels of data completeness. According to aspects of the invention, a data completeness value (e.g., a representation of attributes met, and to what degree they are met) may be assessed by the DSAAM 122, and a desired threshold of completeness may be provided via interaction with the user interface 128, may be provided by a domain related lookup table, or may be otherwise provided by a method selected by one of skill in this field. If the DSAAM 112 determines a desired threshold of completeness is not met, the DSAAM may trigger an alert (e.g., provide an indication of completeness via the user interface 128) or take some other remedial action selected by one of skill this field.

Figure 3:
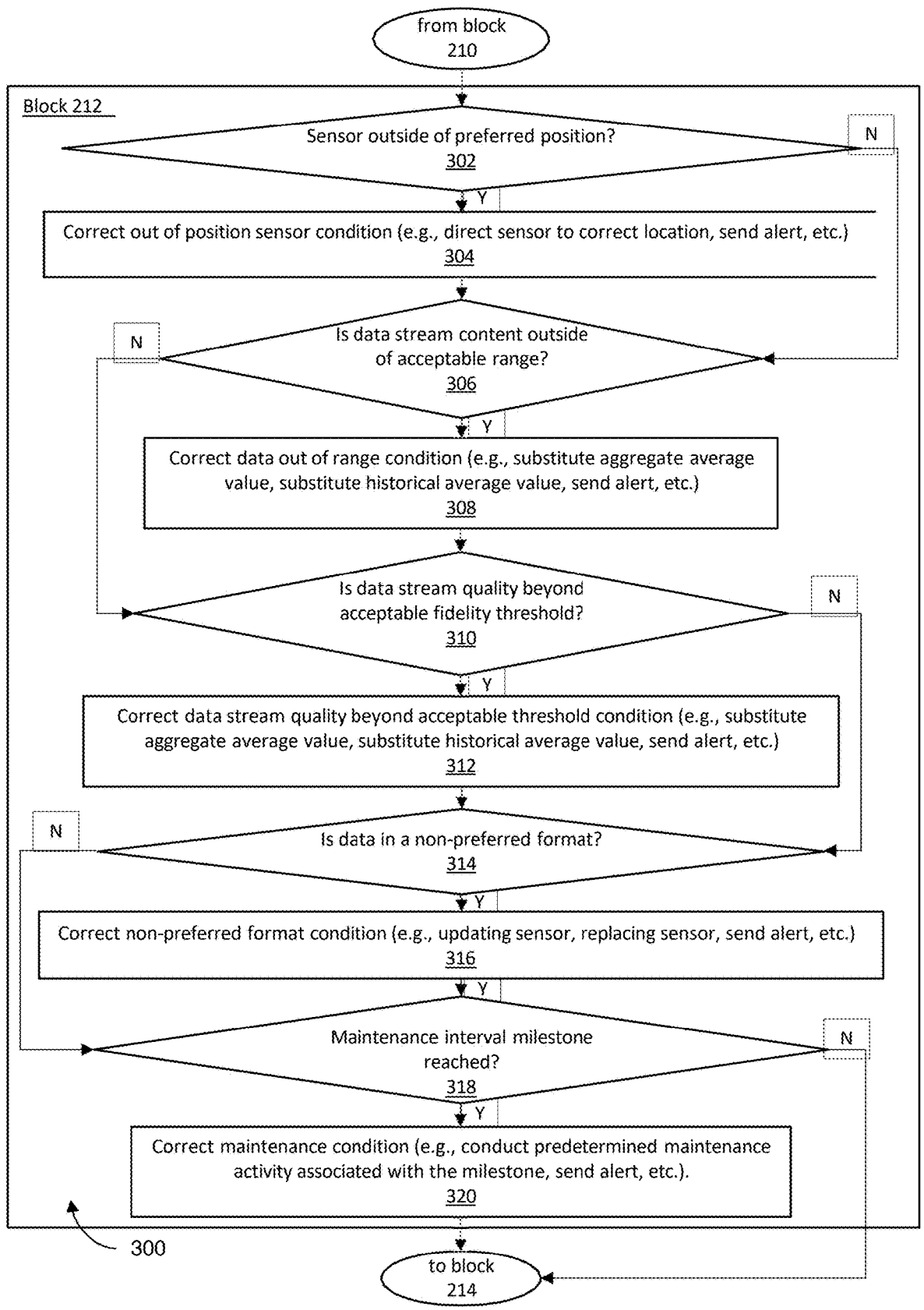
FIG. 3 is a flowchart illustrating aspects of the method shown in FIG. 2, implemented using the system shown in FIG. 1 to automatically establish and apply data stream attribute standards to ensure data completeness in identified data gathering contexts according to embodiments of the present invention.

With continued reference to FIG. 3, details of the cooperation 300 between Data Stream Attribute Assessment Module "DSAAM" 122 (to identify trigger conditions) and Corrective Action Module "CAM" 124 (to address the trigger conditions) occurring in block 212 will now be described in detail. The server computer 102 determines, at block 302, whether a preferred sensor 112' is located outside of a preferred position (e.g., not present in, or has shifted orientation within, a preferred location or orientation identified in the DGAM 110). If a preferred sensor 112' is out of position, the server computer, at block 304, takes a corrective action (e.g., directing the out-position-sensor to correct a location, sending an alert via user interface 128, or some other corrective action selected by one skilled in this field). When no preferred sensor 112' is out of position, flow continues to block 306.

The server computer 102 determines, at block 306, whether a sensor feed from a preferred sensor 112' is sending data content that is outside of a nominal value or range (e.g., when data is too high or too low). In an embodiment, if the server computer 102 receives data content that exceeds an expected value or range identified in the DGAM 110 by 10% (or other value selected by one skill in this field), the server computer takes a corrective action (e.g., direct the out-ofposition sensor to a preferred location, send an alert via user interface 128, or some other corrective action selected by one skilled in this field) at block at block 308. When data content for each of the target data streams is within a relevant nominal value or range, flow continues to block 310.

The server computer 102 determines, at block 310, whether quality of a received data is acceptable. In particular, the server computer 102 determines when a measured fidelity value for a given data stream exceeds an expected threshold identified in the DGAM 110 by 10% (or other value selected by one skill in this field). According to aspects of the invention, if the data stream fidelity is unacceptable, the server computer 102 takes a corrective action associated (e.g., substitute aggregate values from redundant preferred sensors, substitute historical average values from the DGAM 110, send an alert via the user interface 128, or some other corrective action selected by one skilled in this field) at block 312. When data quality of each of the target data streams is acceptable, flow continues to block 314.

The server computer 102 determines, at block 314, whether the format of received data streams is acceptable. In particular, the server computer 102 determines when the streaming format of a received data stream is not using an expected format identified in the DGAM 110. According to aspects of the invention, if the data stream format is unacceptable, the server computer 102 takes a corrective action associated (e.g., updating affected sensor firmware, replacing the affected sensor, sending an alert via user interface 128, or some other corrective action selected by one skilled in this field) at block 316. When data quality of each of the target data streams is acceptable, flow continues to block 318.

The server computer 102 determines, at block 318, whether certain equipment operating conditions have been met. In particular, the server computer 102 determines whether a sensor maintenance interval milestone (e.g., a predetermined number of processing cycles, a remaining percentage of expected sensor life, battery consumption trends, or other value indicated by the DGAM 110) has occurred. According to aspects of the invention, if a maintenance interval milestone has been reached, the server computer 102 conducts a predetermined maintenance activity associated with the milestone (e.g., sensor or other device cleaning, battery replacement, sending an alert via user interface 128, or some other corrective action selected by one skilled in this field) at block 320. When data quality of each of the target data streams is acceptable, flow continues to block 214 (as shown in FIG. 2).

Figure 4:
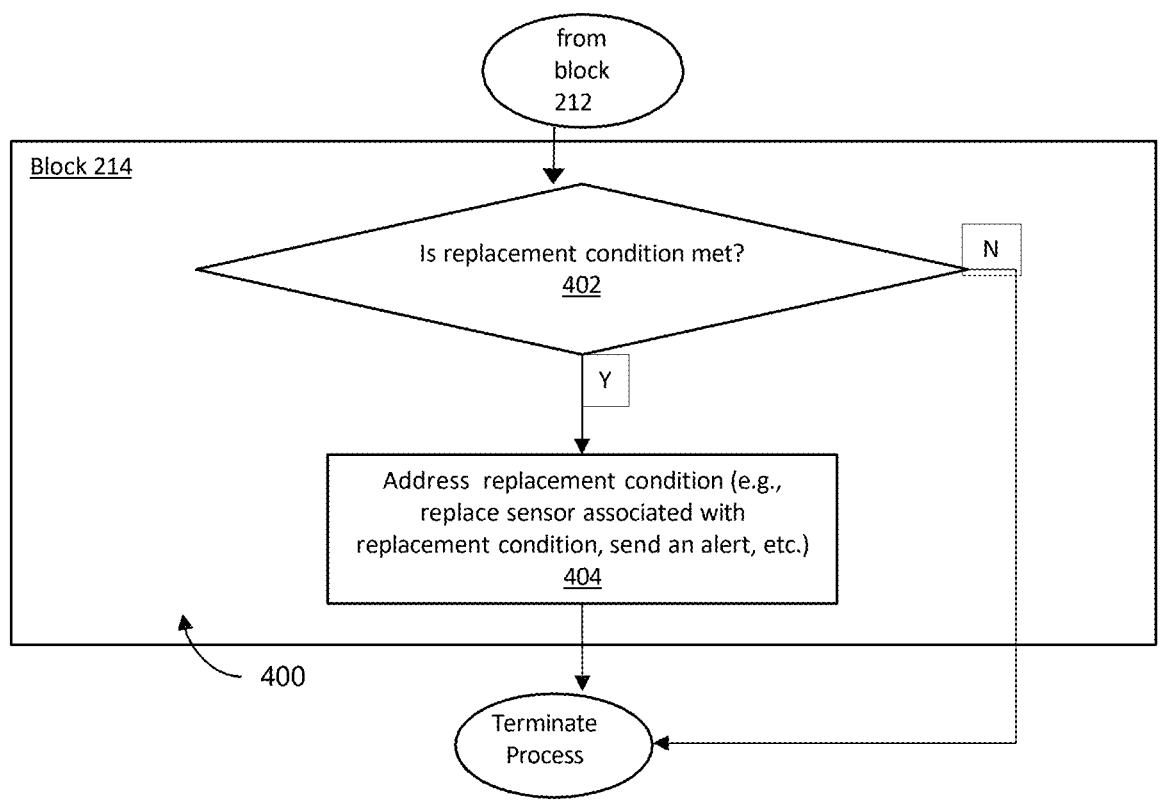
FIG. 4 is a flowchart illustrating aspects of the method shown in FIG. 2, implemented using the system shown in FIG. 1 to automatically establish and apply data stream attribute standards to ensure data completeness in identified data gathering contexts according to embodiments of the present invention.

Now returning to FIG. 2, the server computer 102 monitors the received data streams (e.g., the TSDS) and, at block 214, initiates replacement actions when predetermined replacement conditions occur. In particular, as shown with additional reference to FIG. 4 (in which details of the cooperation 400 between Data Stream Attribute Assessment Module "DSAAM" 122 and Replacement Action Module "RAM" 126 occurring in block 214 are shown schematically). In an embodiment, the server computer 102 monitors the TSDS via Data Stream Attribute Assessment Module "DSAAM" 122 and notes at step 402, the presence of data stream attributes matching predefined replacement conditions (e.g., a specific preferred sensor 112' has met an operational trigger condition a quantity of times exceeding a reliability threshold (such as three times or other value selected by one of skill in this field), a specific preferred sensor sending no data), etc.) are met. Once a replacement condition is met, the DSAAM 122 notifies the Replacement Action Module "RAM" 126, which then initiates, at step 404, a relevant, predetermined replacement action (e.g., such as coordinating with a supply of replacement sensors available to the server computer to replace the faulty sensor, sending an alert via the user interface 128, or some other action selected by one skilled in this field).

Regarding the flowcharts and block diagrams, the flowchart and block diagrams in the Figures of the present disclosure illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 6:
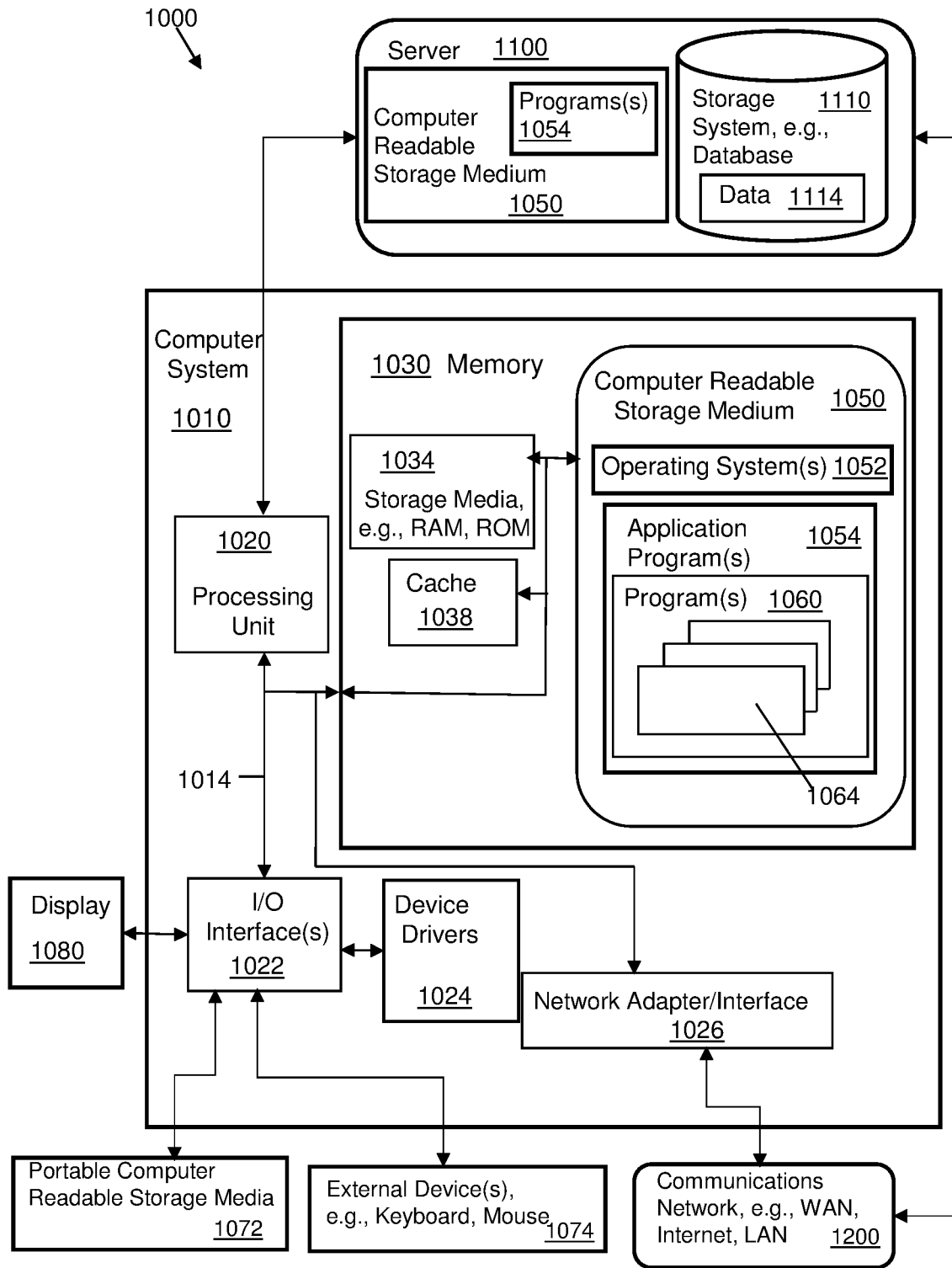
FIG. 6 is a schematic block diagram depicting a computer system according to an embodiment of the disclosure which may be incorporated, all or in part, in one or more computers or devices shown in FIG. 1, and cooperates with the systems and methods shown in FIG. 1.

Referring to FIG. 6, a system or computer environment 1000 includes a computer diagram 1010 shown in the form of a generic computing device. The method of the invention, for example, may be embodied in a program 1060, including program instructions, embodied on a computer readable storage device, or computer readable storage medium, for example, generally referred to as memory 1030 and more specifically, computer readable storage medium 1050. Such memory and/or computer readable storage media includes non-volatile memory or non-volatile storage. For example, memory 1030 can include storage media 1034 such as RAM (Random Access Memory) or ROM (Read Only Memory), and cache memory 1038. The program 1060 is executable by the processor 1020 of the computer system 1010 (to execute program steps, code, or program code). Additional data storage may also be embodied as a database 1110 which includes data 1114. The computer system 1010 and the program 1060 are generic representations of a computer and program that may be local to a user, or provided as a remote service (for example, as a cloud based service), and may be provided in further examples, using a website accessible using the communications network 1200 (e.g., interacting with a network, the Internet, or cloud services). It is understood that the computer system 1010 also generically represents herein a computer device or a computer included in a device, such as a laptop or desktop computer, etc., or one or more servers, alone or as part of a datacenter. The computer system can include a network adapter/interface 1026, and an input/output (I/O) interface(s) 1022. The I/O interface 1022 allows for input and output of data with an external device 1074 that may be connected to the computer system. The network adapter/interface 1026 may provide communications between the computer system a network generically shown as the communications network 1200.

The computer 1010 may be described in the general context of computer system-executable instructions, such as program modules, being executed by a computer system. Generally, program modules may include routines, programs, objects, components, logic, data structures, and so on that perform particular tasks or implement particular abstract data types. The method steps and system components and techniques may be embodied in modules of the program 1060 for performing the tasks of each of the steps of the method and system. The modules are generically represented in the figure as program modules 1064. The program 1060 and program modules 1064 can execute specific steps, routines, sub-routines, instructions or code, of the program.

The method of the present disclosure can be run locally on a device such as a mobile device, or can be run a service, for instance, on the server 1100 which may be remote and can be accessed using the communications network 1200. The program or executable instructions may also be offered as a service by a provider. The computer 1010 may be practiced in a distributed cloud computing environment where tasks are performed by remote processing devices that are linked through a communications network 1200. In a distributed cloud computing environment, program modules may be located in both local and remote computer system storage media including memory storage devices.

The computer 1010 can include a variety of computer readable media. Such media may be any available media that is accessible by the computer 1010 (e.g., computer system, or server), and can include both volatile and non-volatile media, as well as removable and non-removable media. Computer memory 1030 can include additional computer readable media in the form of volatile memory, such as random access memory (RAM) 1034, and/or cache memory 1038. The computer 1010 may further include other removable/non-removable, volatile/non-volatile computer storage media, in one example, portable computer readable storage media 1072. In one embodiment, the computer readable storage medium 1050 can be provided for reading from and writing to a non-removable, non-volatile magnetic media. The computer readable storage medium 1050 can be embodied, for example, as a hard drive. Additional memory and data storage can be provided, for example, as the storage system 1110 (e.g., a database) for storing data 1114 and communicating with the processing unit 1020. The database can be stored on or be part of a server 1100. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1014 by one or more data media interfaces. As will be further depicted and described below, memory 1030 may include at least one program product which can include one or more program modules that are configured to carry out the functions of embodiments of the present invention.

The method(s) described in the present disclosure, for example, may be embodied in one or more computer programs, generically referred to as a program 1060 and can be stored in memory 1030 in the computer readable storage medium 1050. The program 1060 can include program modules 1064. The program modules 1064 can generally carry out functions and/or methodologies of embodiments of the invention as described herein. The one or more programs 1060 are stored in memory 1030 and are executable by the processing unit 1020. By way of example, the memory 1030 may store an operating system 1052, one or more application programs 1054, other program modules, and program data on the computer readable storage medium 1050. It is understood that the program 1060, and the operating system 1052 and the application program(s) 1054 stored on the computer readable storage medium 1050 are similarly executable by the processing unit 1020. It is also understood that the application 1054 and program(s) 1060 are shown generically, and can include all of, or be part of, one or more applications and program discussed in the present disclosure, or vice versa, that is, the application 1054 and program 1060 can be all or part of one or more applications or programs which are discussed in the present disclosure.

One or more programs can be stored in one or more computer readable storage media such that a program is embodied and/or encoded in a computer readable storage medium. In one example, the stored program can include program instructions for execution by a processor, or a computer system having a processor, to perform a method or cause the computer system to perform one or more functions.

The computer 1010 may also communicate with one or more external devices 1074 such as a keyboard, a pointing device, a display 1080, etc.; one or more devices that enable a user to interact with the computer 1010; and/or any devices (e.g., network card, modem, etc.) that enables the computer 1010 to communicate with one or more other computing devices. Such communication can occur via the Input/Output (I/O) interfaces 1022. Still yet, the computer 1010 can communicate with one or more networks 1200 such as a local area network (LAN), a general wide area network (WAN), and/or a public network (e.g., the Internet) via network adapter/interface 1026. As depicted, network adapter 1026 communicates with the other components of the computer 1010 via bus 1014. It should be understood that although not shown, other hardware and/or software components could be used in conjunction with the computer 1010. Examples, include, but are not limited to: microcode, device drivers 1024, redundant processing units, external disk drive arrays, RAID systems, tape drives, and data archival storage systems, etc.

It is understood that a computer or a program running on the computer 1010 may communicate with a server, embodied as the server 1100, via one or more communications networks, embodied as the communications network 1200. The communications network 1200 may include transmission media and network links which include, for example, wireless, wired, or optical fiber, and routers, firewalls, switches, and gateway computers. The communications network may include connections, such as wire, wireless communication links, or fiber optic cables. A communications network may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. A network may also include a number of different types of networks, such as, for example, an intranet, a local area network (LAN), or a wide area network (WAN).

In one example, a computer can use a network which may access a website on the Web (World Wide Web) using the Internet. In one embodiment, a computer 1010, including a mobile device, can use a communications system or network 1200 which can include the Internet, or a public switched telephone network (PSTN) for example, a cellular network. The PSTN may include telephone lines, fiber optic cables, transmission links, cellular networks, and communications satellites. The Internet may facilitate numerous searching and texting techniques, for example, using a cell phone or laptop computer to send queries to search engines via text messages (SMS), Multimedia Messaging Service (MMS) (related to SMS), email, or a web browser. The search engine can retrieve search results, that is, links to websites, documents, or other downloadable data that correspond to the query, and similarly, provide the search results to the user via the device as, for example, a web page of search results.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk®, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
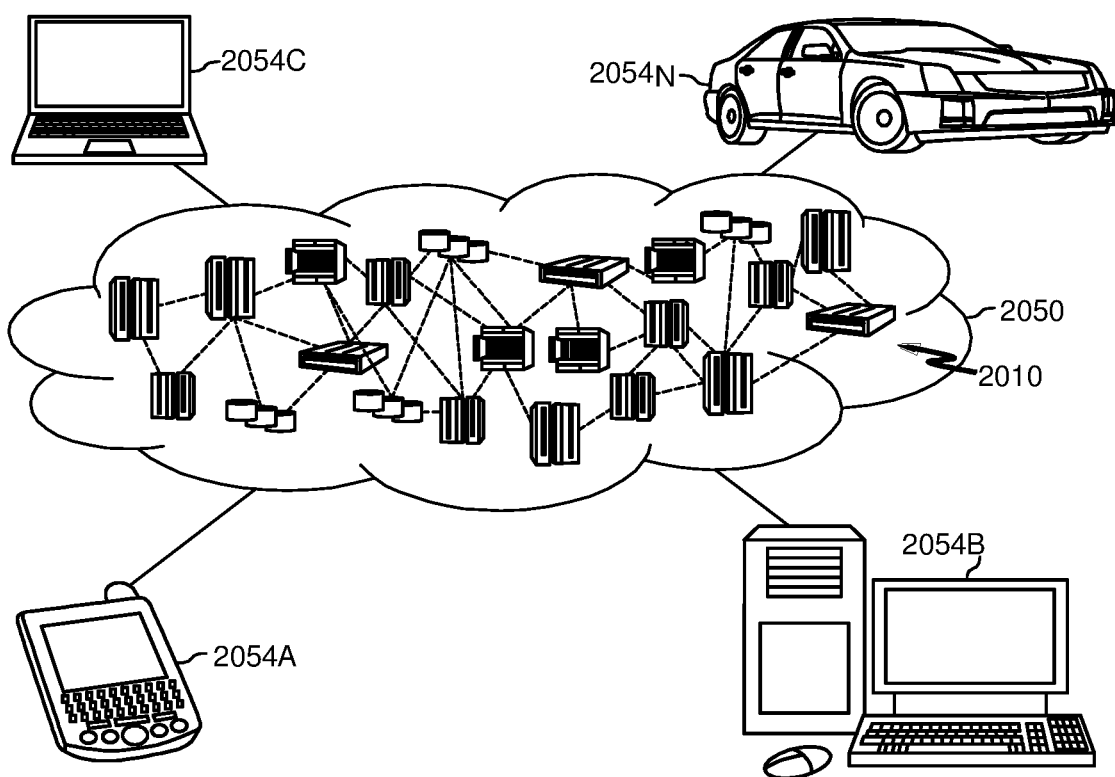
FIG. 7 depicts a cloud computing environment according to an embodiment of the present invention.

Referring now to FIG. 7, illustrative cloud computing environment 2050 is depicted. As shown, cloud computing environment 2050 includes one or more cloud computing nodes 2010 with which local computing devices used by cloud consumers, such as, for example, personal digital assistant (PDA) or cellular telephone 2054A, desktop computer 2054B, laptop computer 2054C, and/or automobile computer system 2054N may communicate. Nodes 2010 may communicate with one another. They may be grouped (not shown) physically or virtually, in one or more networks, such as Private, Community, Public, or Hybrid clouds as described hereinabove, or a combination thereof. This allows cloud computing environment 2050 to offer infrastructure, platforms and/or software as services for which a cloud consumer does not need to maintain resources on a local computing device. It is understood that the types of computing devices 2054A-N shown in FIG. 9 are intended to be illustrative only and that computing nodes 2010 and cloud computing environment 2050 can communicate with any type of computerized device over any type of network and/or network addressable connection (e.g., using a web browser).

Figure 8:
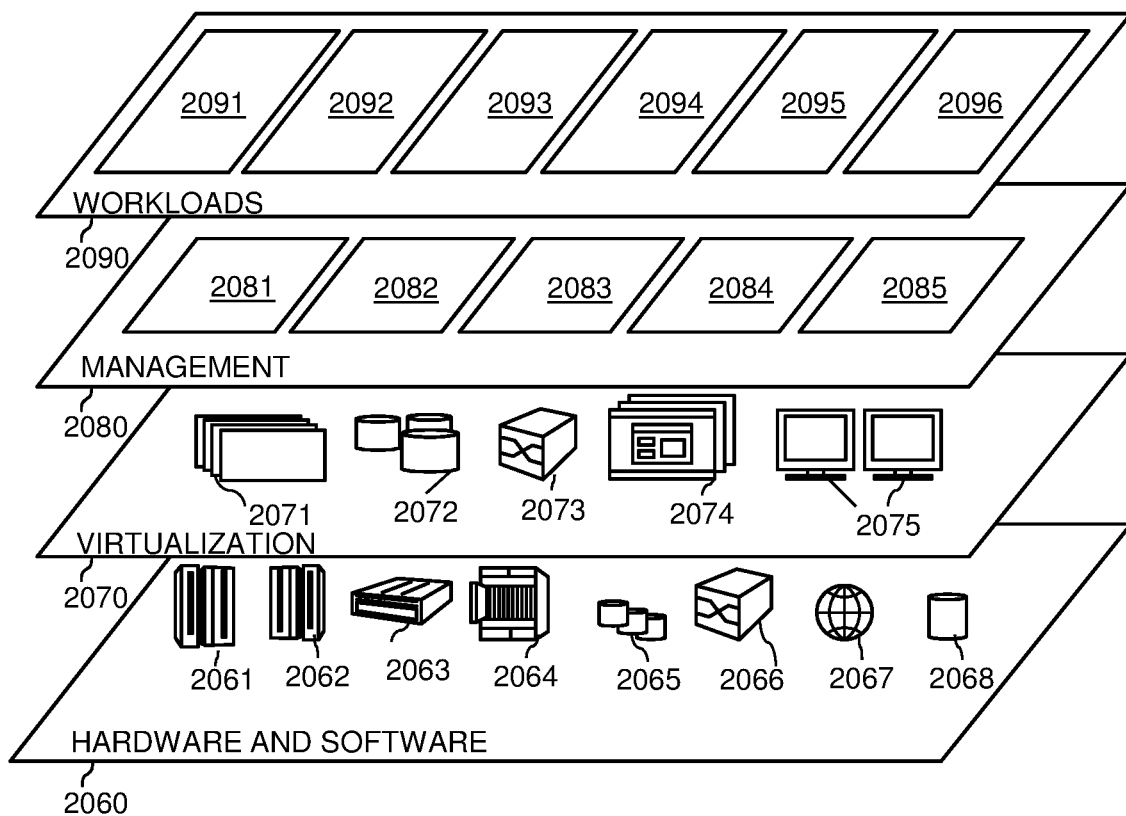
FIG. 8 depicts abstraction model layers according to an embodiment of the present invention.

Referring now to FIG. 8, a set of functional abstraction layers provided by cloud computing environment 2050 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 2060 includes hardware and software components. Examples of hardware components include: mainframes 2061; RISC (Reduced Instruction Set Computer) architecture based servers 2062; servers 2063; blade servers 2064; storage devices 2065; and networks and networking components 2066. In some embodiments, software components include network application server software 2067 and database software 2068.

Virtualization layer 2070 provides an abstraction layer from which the following examples of virtual entities may be provided: virtual servers 2071; virtual storage 2072; virtual networks 2073, including virtual private networks; virtual applications and operating systems 2074; and virtual clients 2075.

In one example, management layer 2080 may provide the functions described below. Resource provisioning 2081 provides dynamic procurement of computing resources and other resources that are utilized to perform tasks within the cloud computing environment. Metering and Pricing 2082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 2083 provides access to the cloud computing environment for consumers and system administrators. Service level management 2084 provides cloud computing resource allocation and management such that required service levels are met. Service Level Agreement (SLA) planning and fulfillment 2085 provide pre-arrangement for, and procurement of, cloud computing resources for which a future requirement is anticipated in accordance with an SLA.

Workloads layer 2090 provides examples of functionality for which the cloud computing environment may be utilized. Examples of workloads and functions which may be provided from this layer include: mapping and navigation 2091; software development and lifecycle management 2092; virtual classroom education delivery 2093; data analytics processing 2094; transaction processing 2095; and automatically establishing and applying data stream attribute standards to ensure data completeness in identified data gathering contexts 2096.

The descriptions of the various embodiments of the present invention have been presented for purposes of illustration, but are not intended to be exhaustive or limited to the embodiments disclosed. Likewise, examples of features or functionality of the embodiments of the disclosure described herein, whether used in the description of a particular embodiment, or listed as examples, are not intended to limit the embodiments of the disclosure described herein, or limit the disclosure to the examples described herein. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method of collecting data relevant to a primary activity occurring in a data gathering zone, comprising:
   receiving, by a computer from an Activity Indication Source (AIS) in communication with the computer, an indication of a primary activity associated with a Data Gathering Zone (DGZ);
   determining, by the computer using a first Machine Learning (ML) model trained to identify data streams relevant for data gathering activities from a corpus of Data Gathering Activity Metadata (DGAM) available to the computer, a Target Set of Data Streams (TSDS) associated with the primary activity;
   responsive to determining the TSDS, identifying by the computer, within a set of sensors having a monitoring arrangement with the DGZ, a set of preferred sensors adapted and arranged to provide the TSDS;
   determining, by the computer using a second Machine Learning (ML) model trained to identify Preferred Data Stream Attributes (PDSAs) for data gathering activities from the DGAM, a target set of PDSAs associated with the primary activity;
   responsive to determining the target set of PDSAs, retrieving by the computer from the set of preferred sensors, at least one data stream relevant to the TSDS; and
   comparing, by the computer, attributes of the at least one data stream to the target set of PDSAs and initiating a corrective action when a predetermined trigger condition is identified, wherein the corrective action includes a predetermined maintenance activity associated with the predetermined trigger condition;
   wherein the predetermined trigger condition is an attribute of the at least one data stream indicating that one of the preferred set of sensors is located outside of a preferred position; and
   wherein, the corrective action includes the computer directing the one of the preferred sensors into the preferred position.

2. The method of claim 1, wherein another predetermined trigger condition is an attribute of the at least one data stream indicating that data stream content is outside of a predetermined acceptable data content range; and
   wherein, another corrective action is selected from a group consisting of replacing received data stream content with substitute data content from a replacement sensor having a monitoring arrangement with the DGZ, replacing received data stream content with nominal data from a database available to the computer, and sending an alert to a user interface operatively connected to the computer.

3. The method of claim 1, wherein another predetermined trigger condition is an attribute of the at least one data stream indicating that data stream quality is beyond an acceptable fidelity threshold; and
   wherein, another corrective action is selected from a group consisting of replacing received data stream content with substitute data content from a replacement sensor having a monitoring arrangement with the DGZ, replacing received data stream content with nominal data from a database available to the computer, and sending an alert to a user interface operatively connected to the computer.

4. The method of claim 1, wherein another predetermined trigger condition is an attribute of the at least one data stream indicating that an out-of-format preferred sensor is streaming data in a non-preferred format; and
   wherein, another corrective action is selected from a group consisting of updating the out-of-format sensor to stream data in a preferred format, replacing the out-of-format sensor, and sending an alert to a user interface operatively connected to the computer.

5. The method of claim 1, wherein another predetermined trigger condition is an attribute of the at least one data stream indicating that a sensor has reached a maintenance interval milestone; and
   wherein, another corrective action is selected from a group consisting of conducting a predetermined maintenance activity associated with the milestone and sending an alert to a user interface operatively connected to the computer.

6. The method of claim 1, further including:
identifying, by the computer within the at least one data stream, an attribute indicating a predefined replacement condition is met; and
in response to identifying the replacement condition being met, initiating by the computer, a responsive action selected from replacing a sensor associated with the replacement condition, and sending an alert to a user interface operatively connected to the computer.

7. A system of collecting data relevant to a primary activity occurring in a data gathering zone, which comprises:
a computer system comprising a computer readable storage medium having program instructions embodied therewith, the program instructions executable by a computer to cause the computer to:
receive from an Activity Indication Source (AIS) in communication with the computer, an indication of a primary activity associated with a Data Gathering Zone (DGZ);
determine using a first Machine Learning (ML) model trained to identify data streams relevant for data gathering activities from a corpus of Data Gathering Activity Metadata (DGAM) available to the computer, a Target Set of Data Streams (TSDS) associated with the primary activity;
responsive to determining the TSDS, identifying by the computer, within a set of sensors having a monitoring arrangement with the DGZ, a set of preferred sensors adapted and arranged to provide the TSDS;
determine using a second Machine Learning (ML) model trained to identify Preferred Data Stream Attributes (PDSAs) for data gathering activities from the DGAM, a target set of PDSAs associated with the primary activity;
responsive to determining the target set of PDSAs, retrieve from the set of preferred sensors, at least one data stream relevant to the TSDS; and
compare attributes of the at least one data stream to the target set of PDSAs and initiate a corrective action when a predetermined trigger condition is identified, wherein the corrective action includes a predetermined maintenance activity associated with the predetermined trigger condition;
wherein the predetermined trigger condition is an attribute of the at least one data stream indicating that one of the preferred set of sensors is located outside of a preferred position; and
wherein, the corrective action includes the computer directing the one of the preferred sensors into the preferred position.

8. The system of claim 7, wherein another predetermined trigger condition is an attribute of the at least one data stream indicating that data stream content is outside of a predetermined acceptable data content range; and
wherein, another corrective action is selected from a group consisting of replacing received data stream content with substitute data content from a replacement sensor having a monitoring arrangement with the DGZ, replacing received data stream content with nominal data from a database available to the computer, and sending an alert to a user interface operatively connected to the computer.

9. The system of claim 7, wherein another predetermined trigger condition is an attribute of the at least one data stream indicating that data stream quality is beyond an acceptable fidelity threshold; and
wherein, another corrective action is selected from a group consisting of replacing received data stream content with substitute data content from a replacement sensor having a monitoring arrangement with the DGZ, replacing received data stream content with nominal data from a database available to the computer, and sending an alert to a user interface operatively connected to the computer.

10. The system of claim 7, wherein another predetermined trigger condition is an attribute of the at least one data stream indicating that an out-of-format preferred sensor is streaming data in a non-preferred format; and
wherein, another corrective action is selected from a group consisting of updating the out-of-format sensor to stream data in a preferred format, replacing the out-of-format sensor, and sending an alert to a user interface operatively connected to the computer.

11. The system of claim 7, wherein another predetermined trigger condition is an attribute of the at least one data stream indicating that a sensor has reached a maintenance interval milestone; and
wherein, another corrective action is selected from a group consisting of conducting a predetermined maintenance activity associated with the milestone and sending an alert to a user interface operatively connected to the computer.

12. The system of claim 7, further including instructions causing the computer to:
identify within the at least one data stream, an attribute indicating a predefined replacement condition is met; and
in response to identifying the replacement condition being met, initiating by the computer, a responsive action selected from replacing a sensor associated with the replacement condition, and sending an alert to a user interface operatively connected to the computer.

13. A computer program product to collect data relevant to a primary activity occurring in a data gathering zone, the computer program product comprising a computer readable storage medium having program instructions embodied therewith, the program instructions executable by a computer to cause the computer to:
receive, using the computer, from an Activity Indication Source (AIS) in communication with the computer, an indication of a primary activity associated with a Data Gathering Zone (DGZ);
determine using a first Machine Learning (ML) model trained to identify data streams relevant for data gathering activities from a corpus of Data Gathering Activity Metadata (DGAM) available to the computer, a Target Set of Data Streams (TSDS) associated with the primary activity;
responsive to determining the TSDS, identify within a set of sensors having a monitoring arrangement with the DGZ, a set of preferred sensors adapted and arranged to provide the TSDS;
determine using a second Machine Learning (ML) model trained to identify Preferred Data Stream Attributes (PDSAs) for data gathering activities from the DGAM, a target set of PDSAs associated with the primary activity;

responsive to determining the target set of PDSAs, retrieve from the set of preferred sensors, at least one data stream relevant to the TSDS; and compare attributes of the at least one data stream to the target set of PDSAs and initiating a corrective action when a predetermined trigger condition is identified, wherein the corrective action includes a predetermined maintenance activity associated with the predetermined trigger condition;

wherein the predetermined trigger condition is an attribute of the at least one data stream indicating that one of the preferred set of sensors is located outside of a preferred position; and wherein, the corrective action includes the computer directing the one of the preferred sensors into the preferred position.

14. The computer program product of claim 13, wherein another predetermined trigger condition is an attribute of the at least one data stream indicating that data stream content is outside of a predetermined acceptable data content range; and wherein, another corrective action is selected from a group consisting of replacing received data stream content with substitute data content from a replacement sensor having a monitoring arrangement with the DGZ, replacing received data stream content with nominal data from a database available to the computer, and sending an alert to a user interface operatively connected to the computer.

15. The computer program product of claim 13, wherein another predetermined trigger condition is an attribute of the at least one data stream indicating that data stream quality is beyond an acceptable fidelity threshold; and wherein, another corrective action is selected from a group consisting of replacing received data stream content with substitute data content from a replacement sensor having a monitoring arrangement with the DGZ, replacing received data stream content with nominal data from a database available to the computer, and sending an alert to a user interface operatively connected to the computer.

16. The computer program product of claim 13, wherein another predetermined trigger condition is an attribute of the at least one data stream indicating that a sensor has reached a maintenance interval milestone; and wherein, another corrective action is selected from a group consisting of conducting a predetermined maintenance activity associated with the milestone and sending an alert to a user interface operatively connected to the computer.

17. The computer program product of claim 13, further including instructions causing the computer to:

identifying, by the computer within the at least one data stream, an attribute indicating a predefined replacement condition is met; and in response to identifying the replacement condition being met, initiating by the computer, a responsive action selected from replacing a sensor associated with the replacement condition, and sending an alert to a user interface operatively connected to the computer.

* * * * *